Jan. 29, 1935. A. F. C. POLLARD 1,989,336
OPTICAL PROJECTION APPARATUS
Filed April 17, 1933 2 Sheets-Sheet 1

A. F. C. Pollard
INVENTOR

By Marks & Clerk
Attys.

Patented Jan. 29, 1935

1,989,336

UNITED STATES PATENT OFFICE 1,989,336

OPTICAL PROJECTION APPARATUS

Alan Faraday Campbell Pollard, London, England, assignor, by direct and mesne assignments, of one-tenth to Sky Publicity Limited, London, England, and nine-tenths to William Francis Egginton Briggs, London, England Application April 17, 1933, Serial No. 666,595
In Great Britain July 15, 1932

3 Claims. (Cl. 88—24)

The invention relates to optical projection apparatus and in particular to sky projectors for throwing letters, designs and so forth on the clouds for publicity or other purposes.

One proposed form of apparatus of the kind in question comprises a source of light in the focus of a parabolic mirror with a representation of the "object" to be projected, e. g., a stencil, disposed in a plane transverse to the projected beam, an image of the stencil being formed by help of a suitable lens system.

This proposed apparatus involves the use of a large stencil incorrectly illuminated by more or less parallel light and is necessarily unwieldy and cumbrous while a considerable loss of light occurs, thereby decreasing the illumination of the projected image.

A main object of the present invention is to obviate the above objections.

With such a main object, the invention consists in optical projection apparatus comprising the combinations of elements hereinafter described and particularly pointed out in the claims.

It will be understood that with the type of apparatus according to the present invention, it is essential for success that the axis of the conical beam of light reflected from the mirror should pass centrally through the operative part of the "object" and coincide with the axis of the lens system.

When an electric arc is used as the source of light with the positive carbon axially disposed with its crater towards the mirror, the image of the crater formed on the stencil may be a circular area of only some three inches diameter situated ten feet or thereabouts from the mirror and in such a case it is found impossible in practice to provide a mounting of such rigidity that relative displacements of the parts of the apparatus do not occur.

Thus, such a displacement, due to differential changes of temperature or other causes, even if comparatively slight may readily cause a small angular displacement of the mirror sufficient to deflect the beam of light therefrom so that it is partly or wholly out of register with the "object".

A particular object of the present invention is to overcome such difficulties.

Referring to the accompanying drawings, which are in part of a diagrammatic nature:—

Figure 2 shows a side view of one of the units for tilting the mirror, while

Figure 1:
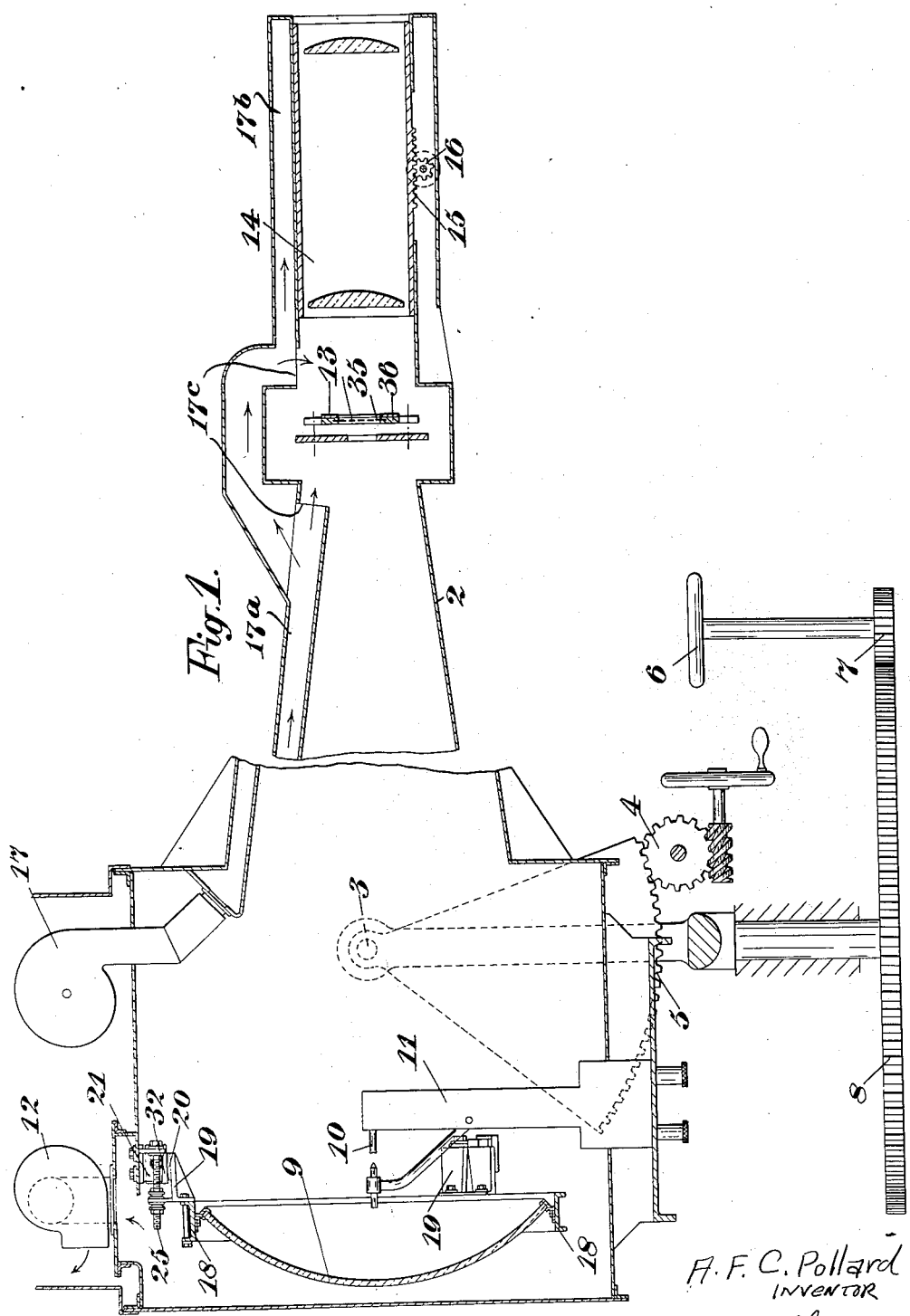
Figure 1 shows a sectional elevation of one form of the invention as a whole, in which the mirror is of ellipsoidal form.

In carrying the invention into effect according to one form as shown in Figure 1, the sky projector apparatus comprises an elongated framework or casing, 2, mounted on trunnions, 3, about which it can be turned to different altitudes by a gear wheel, 4, engaging with a toothed sector, 5. The projector can also be moved in azimuth by help of the hand-wheel, 6, actuating the toothed pinion, 7, gearing with the fixed gear wheel, 8.

Any suitable locks or clamps may be provided to prevent accidental movement of the projector, e. g., in a cross wind; or again stops may be arranged where necessary to limit the movement of the projector in azimuth and so prevent tangling of the leads to the arc lamp hereinafter referred to.

The projector is provided with an ellipsoidal mirror, 9, details of the mounting of which will be described hereinafter, in the proximate focus of which is arranged the crater carbon, 10, of an arc lamp, 11, having the usual focussing adjustments, products of combustion from the arc being withdrawn from the casing by means of a suction fan, 12.

The object, 13, to be projected, made of or depicted on quartz or other refractory material, is arranged in the conjugate focus of the mirror, 9, whence the rays of light pass on through the lens system, 14, adjustable by the rack, 15, and pinion, 16.

Since heat in addition to light is concentrated at the conjugate focus, the object, 13, and lens system, 14, may be cooled, if desired, by air from a fan, 17, driven for example by an electric motor, the air being led through a duct, 17a, within the casing to a jacket, 17b, surrounding the lens system, apertures, 17c, being provided in the wall of the duct in the neighbourhood of the object to be projected.

To secure critical illumination of the projected image, the major axis of the mirror, 9, and the optical axis of the lens system, 14, must be in line while the centre of the crater carbon, 10, and the object, 13, must be disposed on the same line; in addition the numerical aperture of the lens system must be equal to that of the mirror, or in other words, the lens system must be such as to receive the full expanding cone of light from the focus without diminution.

Figure 2:
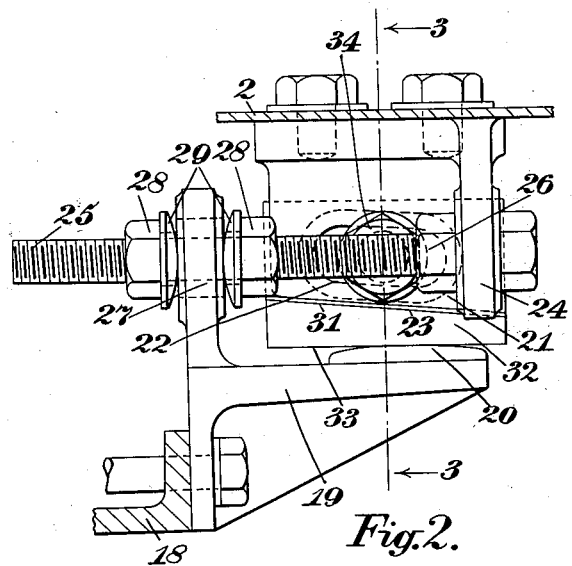
Figure 3:
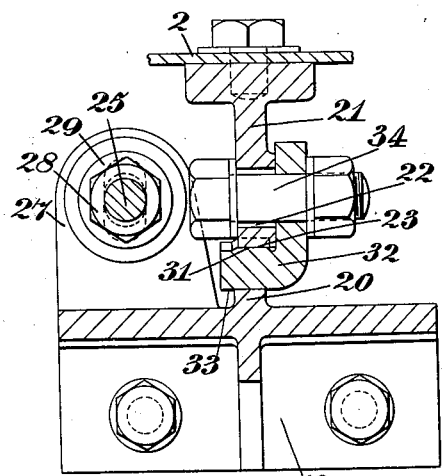
Figure 3 is a section on the line 3—3 of Figure 2.

In order to provide for an angular movement of the mirror, 9, about any axis in relation to the casing according to one plan, it is mounted on a ring, 18, from which project three equally spaced brackets, 19, each provided with a spherical facing, 20, with centre coinciding with the proximate focus of the ellipsoid. The spherical surface, 20, contacts (see Figures 2 and 3) with three or more spaced locating devices, each comprising a plate, 21, with slot, 22, secured to the casing, 2, the plate having an inclined face, 23. From the plate, 21, projects a lug, 24, to which a bolt, 25, is secured at one end by the nut, 26, the other end of the bolt passing freely through a slotted ear, 27, in which it is adjustable longitudinally by the nuts, 28, 28, with spherical seats, 29, 29, arranged one on each side of the ear, 27.

The inclined face, 23, of the plate, 21, co-acts with a similarly inclined face, 31, on an angle piece, 32, which can be adjusted in any position by sliding its face, 31, along the fixed face, 23, until a surface, 33, on the angle piece bears against the spherical surface, 20; the angle piece, 32, can then be clamped in position by a bolt, 34, passing through the slot, 22.

By such means, any angle of departure of the mirror from its proper position may be readily corrected and the image of the crater of the carbon maintained in its correct position on the optical axis of the system.

As regards the "object" to be projected, this may take the form of a stencil and is preferably made of refractory material since the heat concentrated on the stencil is in general sufficiently intense to destroy stencils made of combustible material. A suitable stencil consists of platinum foil suitably perforated to produce the desired word or image and the foil can be mounted in a holder, 35, slidable transversely in relation to the casing, 2, in a suitable guide, 36, or it can be of tape form and passed over suitable spools and fed film-fashion through a gate located in the focal plane of the light source.

Various departures from the constructions and processes described above may be made without exceeding the scope of the invention as defined in the claims appendant hereto.

I claim:

1. In combination in optical apparatus for projecting images on clouds or other distant objects, a supporting framework and carried thereby a mirror, a source of light from which the rays of light are focused on the object to be projected, a lens system disposed on the side of said focus remote from the mirror, together with a jacket surrounding said lens system and means for circulating cooling air through said jacket, said means including a duct leading to said jacket with at least one outlet from said duct in the neighbourhood of said object to be projected.

2. In combination in optical apparatus for projecting images on clouds or other distant objects, an ellipsoidal projector mirror, a mounting for said mirror, said mounting including circumferentially-disposed parts having spherical surfaces with a common centre at the near focus of said mirror, a projector framework carrying said mirror, together with means for adjusting the position of said mirror transversely in relation to said projector framework, said means including adjustable wedge-like members in operative association with said spherical surfaces and carried by said projector framework.

3. In combination in optical apparatus for projecting images on clouds or other distant objects, an ellipsoidal projecting mirror, a mounting for said mirror, said mounting including circumferentially-disposed parts having spherical surfaces with a common centre at the near focus of said mirror, a projector framework carrying said mirror, and having locating members in operative association with said spherical surfaces, together with means for tilting said mirror about any axis transverse to said projector framework while maintaining said operative association between said locating members and said spherical surfaces.

ALAN FARADAY CAMPBELL POLLARD.